June 10, 1930.  A. Y. DODGE  1,762,290
BRAKE CONTROL
Filed Oct. 11, 1924   3 Sheets-Sheet 1

Witness
Martin H. Olsen.

Inventor
Adiel Y. Dodge
By Cromwell, Greist & Warden
Atty's

June 10, 1930.　　　A. Y. DODGE　　　1,762,290
BRAKE CONTROL
Filed Oct. 11, 1924　　　3 Sheets-Sheet 2
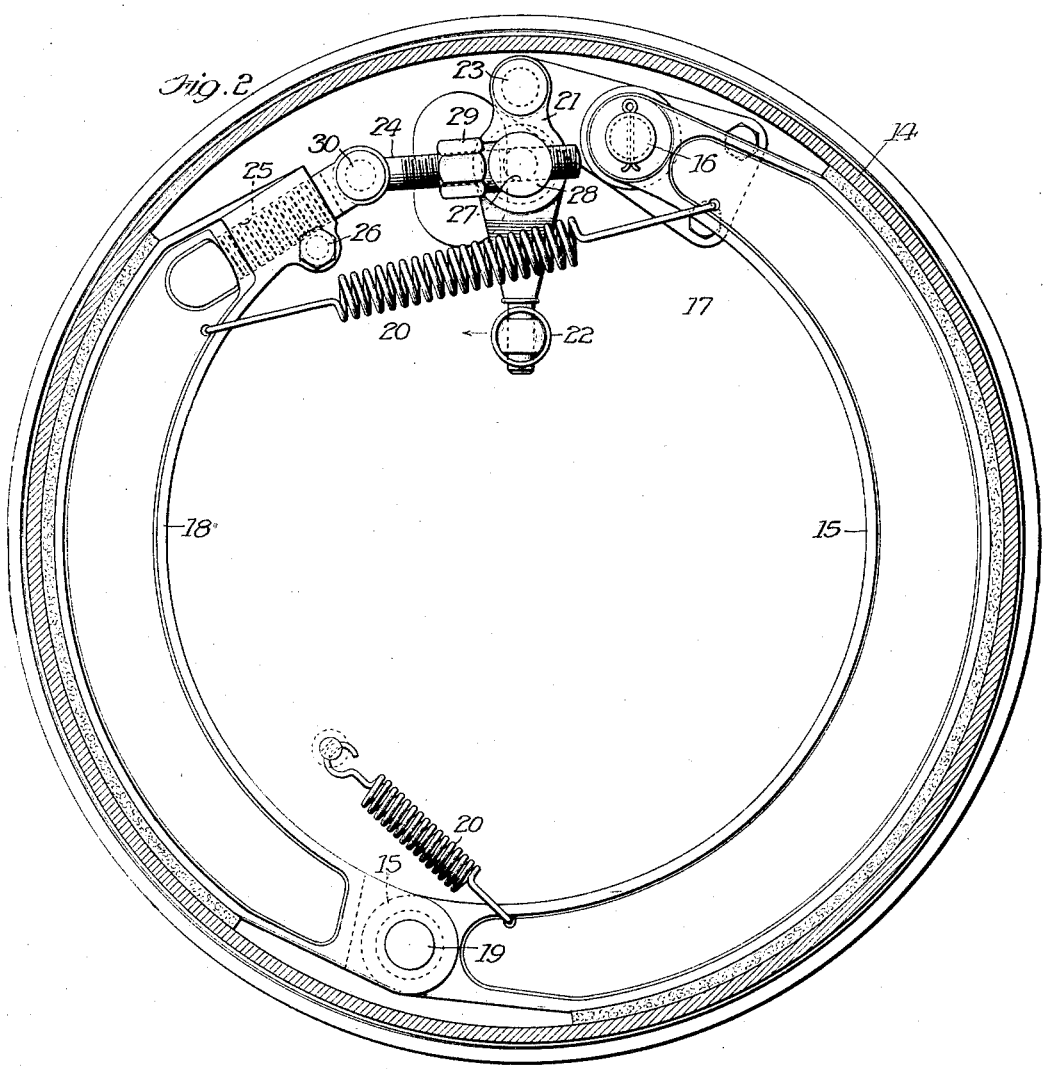
Witness
Martin H. Olsen.
Inventor
Adiel Y. Dodge
By Cromwell, Greed & Warden
Attys.

June 10, 1930. A. Y. DODGE 1,762,290
BRAKE CONTROL
Filed Oct. 11, 1924   3 Sheets-Sheet 3
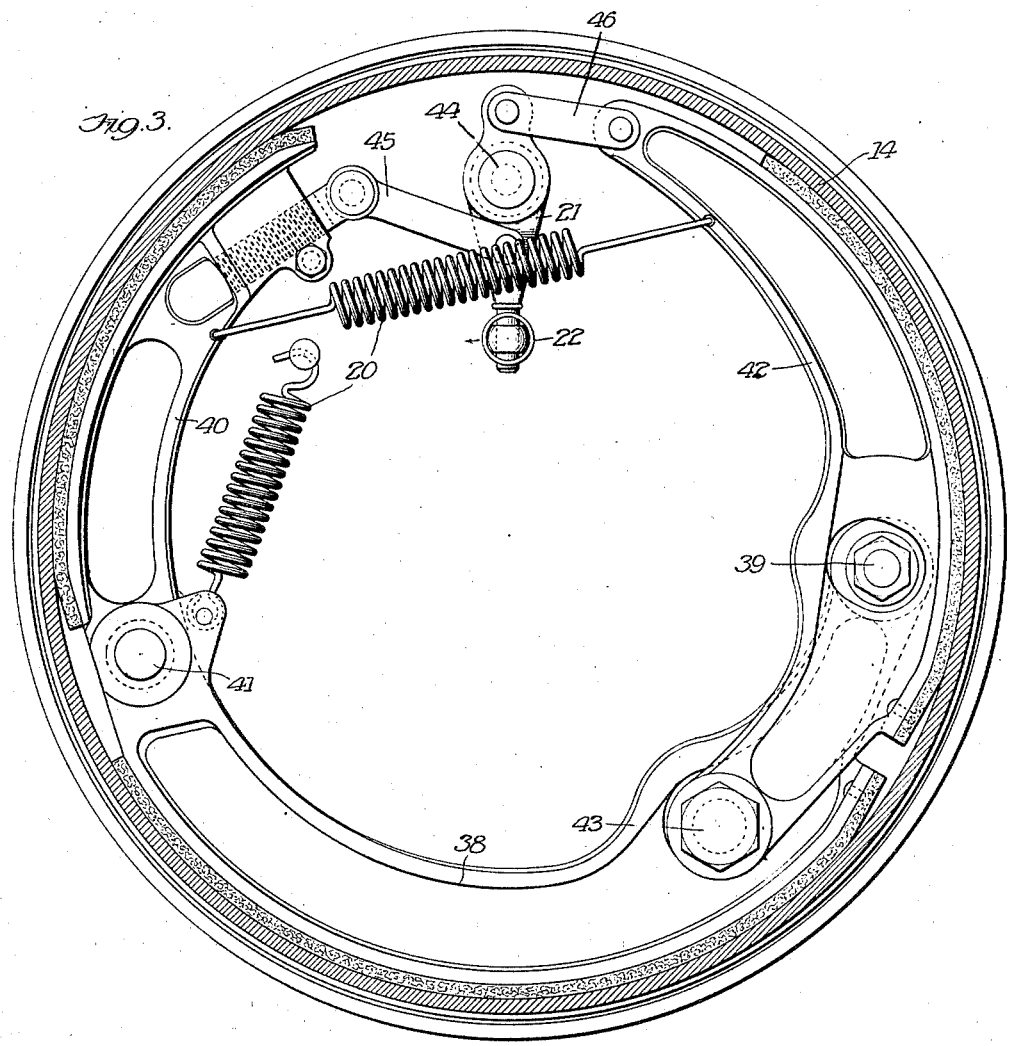
Inventor
Adiel Y. Dodge Patented June 10, 1930

1,762,290

UNITED STATES PATENT OFFICE

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS

BRAKE CONTROL

Application filed October 11, 1924. Serial No. 742,997.

The principal object of the invention is to provide an improved front wheel brake control in the form of a system of cooperating levers between the brake and the adjacent actuating means for the same.

Other objects and advantages of the invention will be evident upon an understanding of the construction, arrangement and operation of the brake control.

In order that the invention may be readily understood, one of the many possible structural embodiments of which the invention is susceptible is presented in the accompanying drawings and in the following detailed description based thereon. It will be understood, however, that such embodiment while including my invention, is illustrative only, and is not intended to restrict the spirit of the invention short of its comprehensive scope as defined by the appended claims.

In the drawings—

Fig. 2 is another vertical section through the assembly, taken at right angles to Fig. 1; and Fig. 3 is another vertical section through a slightly modified assembly, taken in the same plane as Fig. 2.

Figure 1:
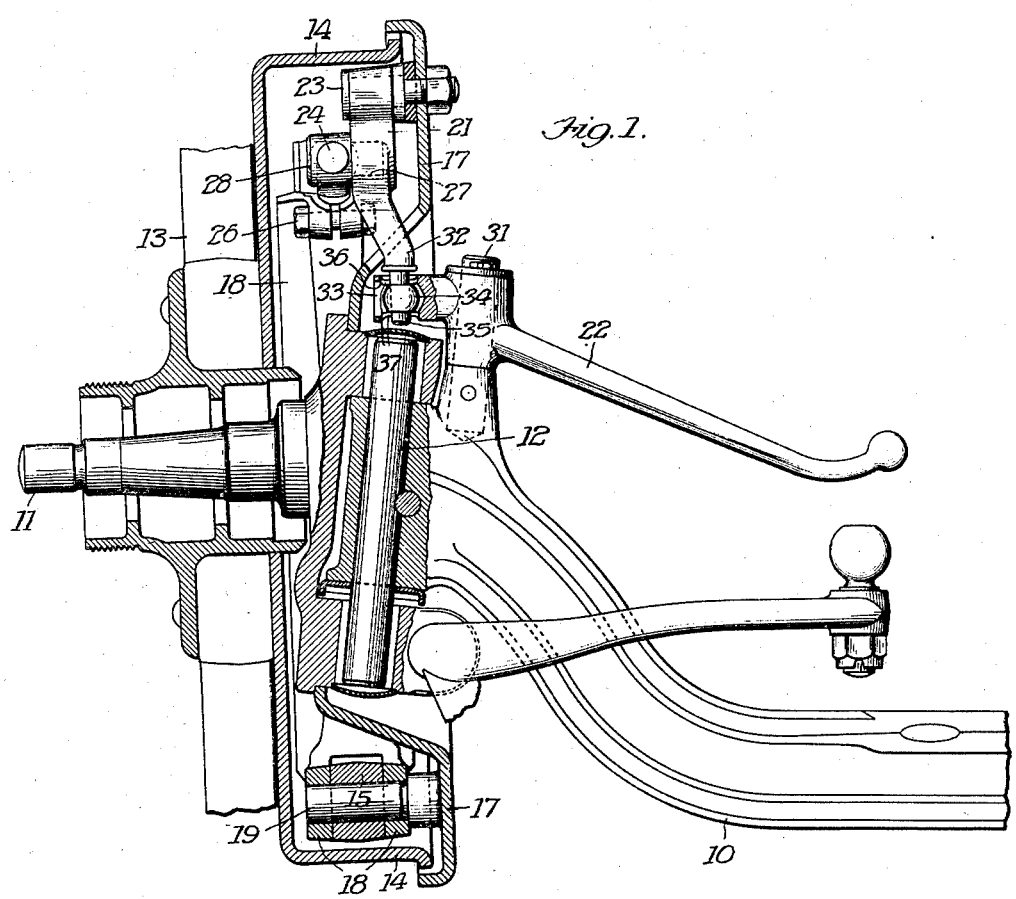
Fig. 1 is a vertical section through a front wheel brake assembly equipped with the brake control of the invention.

In Figs. 1 and 2 of the drawings is illustrated a front wheel assembly consisting of an axle 10, a spindle 11 having an inclined pivotal connection 12 with the axle, and a wheel 13 journaled on the spindle. The brake associated with the assembly may be of any suitable type, but is shown in Figs. 1 and 2 as a two-shoe self-wrapping brake consisting of a drum 14 secured to the wheel, a shoe 15 pivoted at 16 to an anchor plate 17 secured to the spindle, another shoe 18 pivoted at 19 to the shoe 15, and a plurality of suitably arranged springs 20 tending to hold the shoes normally in a contracted position away from the drum and against the anchor plate.

The brake control—which constitutes the invention—consists of a system of cooperating levers 21 and 22 between the brake and the usual brake actuating means. The lever 21 is pivoted at its upper end to the anchor plate by a pin 23 for movement in a substantially vertical plane, and is adjustably connected intermediate its ends with the upper free end of the shoe 18 by a medially articulated double-ended bolt 24. One end of the bolt 24 is screwed into a threaded recess 25 in the shoe 18 and there locked by a screw 26 which contracts a slot in the walls of the recess, and the other end is screwed into a threaded recess 27 in a laterally projecting lug 28 on the lever 21 and there locked by a lock nut 29 on the bolt which bears against the projection. The articulation between the ends of the bolt 24 is had through a pivot 30 which may be removed when adjustment is to be effected between the lever 21 and the shoe 18. The lever 22 is pivoted intermediate its ends to the axle by a pin 31 for movement in a substantially horizontal plane, and is connected at its end remote from the brake and near the chassis with the usual pull rod (not shown) for actuating the brake. The lower end 32 of the lever 21 is slidably and universally connected with the adjacent end 33 of the lever 22 by a coupling member in the form of a ball 34 disposed above and in axial alignment with the inclined pivot 12 when the brake is applied. The ball 34 is diametrically apertured to receive loosely a cylindrical stud 35 on the end 32 of the lever 21, and fits loosely within a cylindrical recess 36 in the end 33 of the lever 22. The stud 35 in passing through the ball 34 extends through two elongated slots 37 in the opposite walls of the recess 36.

It will be understood from the foregoing description that when the brake actuating means is moved to set the brake, it will oscillate the lever 22 in a substantially horizontal plane, the lever 22 will in turn oscillate the cooperating lever 21 in a substantially vertical plane, and the lever 21 will in turn move the shoe 18 into engagement with the drum 14 to set the brake. The particular angle at which the wheel 13 is positioned during application of the brake is immaterial, as the cooperation between the levers is had at a neutral point in axial alignment with the pivot about which the wheel swings. The brake control possesses, in its simple construction, its compact arrangement and its efficient operation, many salient features of superior merit.

In Fig. 3 is illustrated a slightly modified form of the invention wherein the associated brake is a three-shoe self-wrapping structure, consisting of a shoe 38, pivoted at 39 to the anchor plate, another shoe 40 pivoted at 41 to the shoe 38, and a third shoe 42 independent of the shoes 38 and 40 and pivoted to the anchor plate at 43 in overlapped relation to the adjacent end of the shoe 38. This brake requires in its operation that the movement be imparted to the free ends of the shoes 40 and 42, and consequently necessitates a modification of the mounting of the lever 21 to the extent that the lever is pivoted to the anchor plate at 44 intermediate its ends rather than at its upper end. The free ends of the shoes 40 and 42 are connected with the lever 21 at points on the lever at opposite sides of the pivot 44, the coupling means between the shoes and the lever being suitable links 45 and 46.

I claim:

1. A front wheel brake assembly, comprising a drum secured to the wheel, a mounting plate secured to the wheel spindle, two articulated brake shoes pivoted at the unarticulated end of one shoe to the mounting plate, a lever pivoted to the mounting plate and cooperating with the unarticulated end of the other shoe for moving the same, and means for oscillating the lever.

2. A front wheel brake assembly, comprising a drum secured to the wheel, a mounting plate secured to the wheel spindle, a plurality of articulated brake shoes pivoted at the unarticulated end of one shoe to the mounting plate, a lever pivoted to the mounting plate and connected with the unarticulated end of the other shoe for supporting and moving the same, and a second lever cooperating with the first for oscillating the same.

3. A brake comprising, in combination, a drum, an anchored shoe within the drum, connected shoes within the drum anchored adjacent the anchored shoe, the free ends of the anchored shoe and of the connected shoes being adjacent, a lever, and connections from the lever to said free ends for prying them apart.

4. A brake having, in combination, retarding means, and two levers arranged generally at right angles to each other and operating the retarding means, one lever having a ball slidably mounted on its end and movable along the lever, and the other lever having a recessed portion embracing said ball and moving it positively in both directions.

5. A brake having, in combination, retarding means, and two levers arranged generally at right angles to each other and operating the retarding means, one lever having a ball at its end, and the other lever having a recessed portion embracing said ball and moving it positively in both directions.

In testimony whereof I have hereunto signed my name.

ADIEL Y. DODGE.